United States Patent [19]
Laue

[11] Patent Number: 5,881,608
[45] Date of Patent: Mar. 16, 1999

[54] PEDAL ROD WITH LONGITUDINALLY PRESSED SPRING SEAT

[75] Inventor: Charles E. Laue, Arlington Heights, Ill.

[73] Assignee: Charles E. Laue Patent Trust, Arlington Heights, Ill.

[21] Appl. No.: 7,866

[22] Filed: Jan. 15, 1998

[51] Int. Cl.$^6$ ..................................................... F16C 7/02
[52] U.S. Cl. ........................................ 74/579 R; 74/512

*Primary Examiner*—Charles A Marmor
*Assistant Examiner*—Mary Ann Marmor
*Attorney, Agent, or Firm*—Hill & Simpson

[57] ABSTRACT

A pedal rod for an automotive vehicle braking system has a spring seat formed between the ball and the head by displacing a thin peripheral laminar layer through a finite longitudinal dimension thereby to form a circumferentially continuous annular radially outwardly projecting spring seat.

1 Claim, 1 Drawing Sheet

U.S. Patent    Mar. 16, 1999    5,881,608
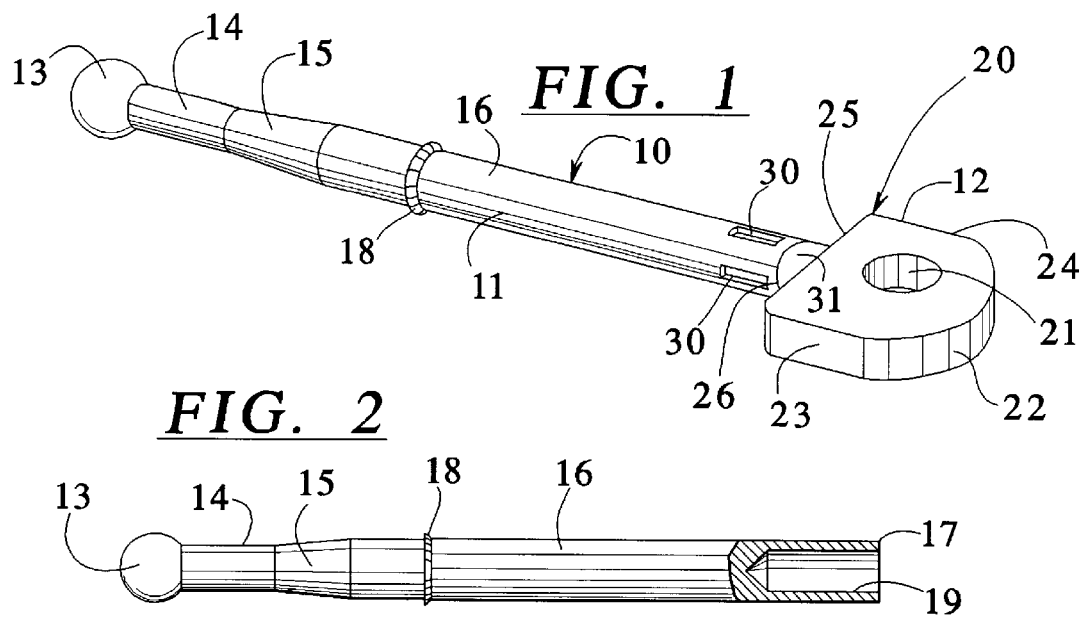
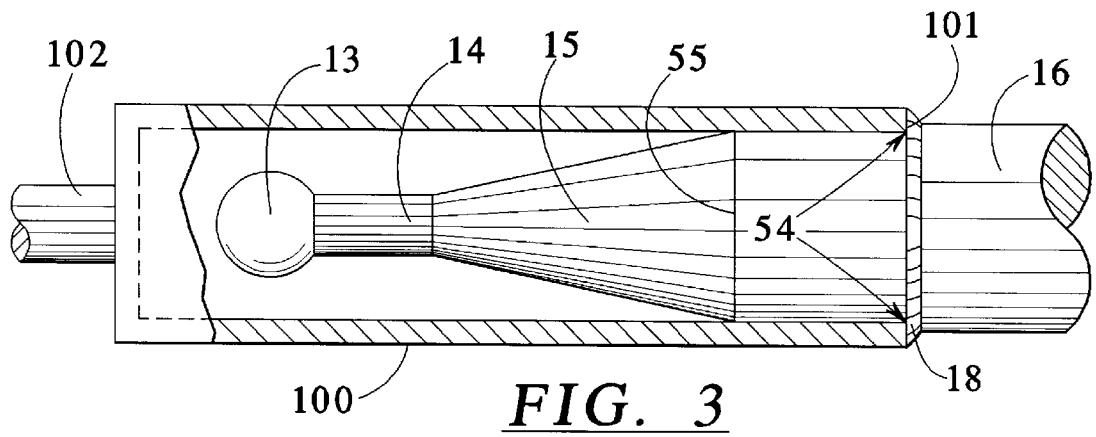
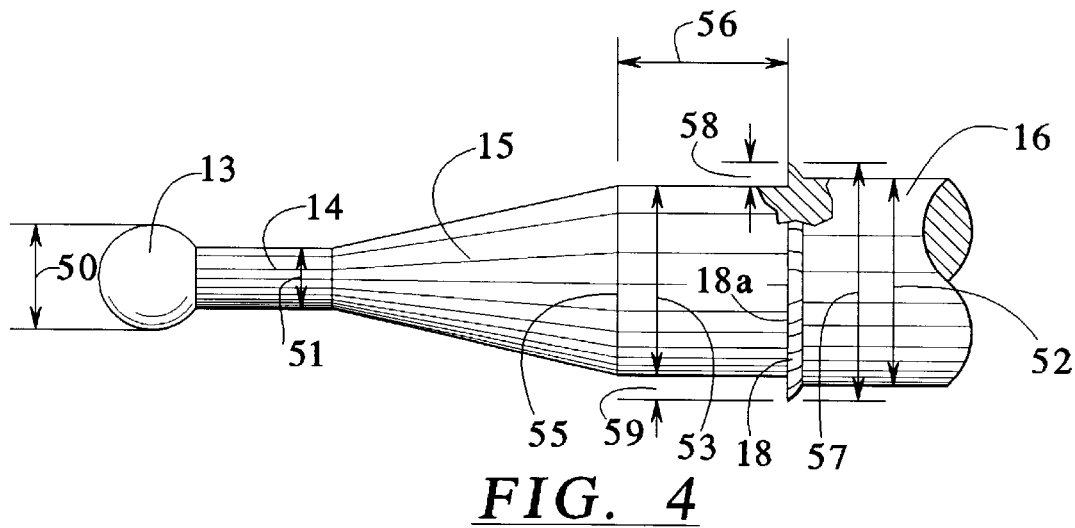

PEDAL ROD WITH LONGITUDINALLY PRESSED SPRING SEAT

BACKGROUND OF THE INVENTION

1. Field of the Invention

This invention relates specifically to a pedal rod of the type utilized in the vehicular vehicle industry and wherein devices are actuated by an operator exerting force via a rod-like instrumentality interconnecting a foot or hand operated member and the operating mechanism of a vehicle such as the braking system of a car or truck.

2. The Prior Art

In my prior U.S. Pat. No. 5,425,286 issued Jun. 20, 1995 I disclosed a pedal rod of the type utilized in this invention wherein a spring seating shoulder is formed on the pedal rod by a transverse stamping operation. The spring seat is formed by displacing the metal of the surface in a transverse direction so that it is literally moved out of the peripheral surface of the body portion and is projected outwardly so that a plurality of projections circumferentially spaced apart from one another extend radially outwardly of the pedal rod body, thereby affording a spring seating means.

SUMMARY OF THE INVENTION

By the present invention it is contemplated that the shank of the pedal rod be sized sufficiently larger in diameter than the ball on the end of the pedal rod and the tapered ramp joining the ball and the main body portion of the pedal rod, so that a cylindrical cutting and forming tool may be longitudinally passed over the ball and the ramp in a co-axial relationship with the pedal rod to engage the peripheral surface of the main body portion.

As the cutting and forming tool engages the surface and is relatively axially advanced with respect to the main body portion, it will cut and form a thin layer of metal and push it longitudinally until there is formed a circumferentially continuous annular shoulder which projects radially outwardly to form an integral spring seat on the main body of the pedal rod.

By virtue of such formation, there are no localized weak spots and the risks of operational failure due to unusual stress conditions are minimized. Further, the longitudinal thrusting action of an appropriate cutting and forming tool are quickly and easily accomplished on computer controlled automatic machinery so that the provision of the spring seat can be accomplished in a highly economical and efficient manner.

DESCRIPTION OF THE DRAWINGS

FIG. 1 is a perspective view of a pedal rod unit constructed in accordance with the principles of the present invention.

FIG. 2 is an elevation view showing a side elevation of the shaft part of the present invention, with parts broken away and with parts shown in cross-section to illustrate additional details of the shaft or rod part of the present invention.

FIG. 3 is an enlarged fragmentary elevational view with parts shown broken away and in cross-section and depicting somewhat schematically a cutting and forming tool in the step of cutting and forming the spring seat pursuant to this invention.

FIG. 4 is a view similar to FIG. 3, but with the cutting and forming tool removed so that the relative dimensioning of the pedal rod parts may be more clearly explained.

DESCRIPTION OF THE PREFERRED EMBODIMENTS

It is believed that the method technology of the present invention and the preferred sequencing of the manufacturing techniques will be understood from the description which follows.

Although the principles of the present invention are generally applicable to pedal rods made in a variety of ways and having a variety of structural characteristics which are independent of the improvements of the present invention, I have disclosed the principles of the invention as applied to a two-piece pedal rod considered to be the best mode of the present invention and illustrative of method and means claimed herein.

A metal bar stock can be employed to provide the pedal rod provided in accordance with this invention.

Thus, in the practice of the present invention, it is my objective to provide a pedal rod such as that illustrated in FIG. 1 and identified generally at 10. The pedal rod 10 consists of two separate elements or parts constituting a rod or shaft part 11 and a head part 12.

For the rod or shaft elements in the performance environment of an automotive braking assembly, I have selected material of Rockwell "B" 95-105 12L14 steel. That material I have found to be particularly appropriate for machining and stamping operations, especially when such operations are conducted on automated machinery as is generally contemplated in prescribing modern low cost manufacturing techniques.

Referring now to FIG. 2, the rod or shaft part is formed by machining a rod-shaped cylindrical work piece into an elongated cylindrically shaped body having a ball 13 at its free end, adapted to cooperate with the mechanism with which the pedal rod is associated. Extending axially away from the ball 13 is a reduced diameter shaft portion 14 which merges with a transition stage formed as an outwardly tapered section 15 and expanding to a larger diameter body portion which is of uniform diametral size throughout its length as shown at 16 and extending to the end 17 of the work piece.

The step of forming recess 19 is accomplished by drilling and reaming the recess, for example, on a multiple spindle screw machine, which may also be used to form the ball 13.

The head part 12 can be formed in a punch press operation simply by punching in a single stroke the configuration of a main body portion 20 having a through opening 21 centrally disposed therein. A curved outer edge is shown at 22 disposed approximately in concentric spacing relative to the opening 21 and terminating in spaced parallel side walls 23 and 24.

The side walls 23 and 24 terminate in a flat planar end wall 25 from which projects at a central axial position a generally rectangular boss 26.

It will be appreciated that the rod or shaft element 11 and the head part or element 12 constitute first and second parts which may be permanently bonded and assembled together by pressure crimping and/or by heat bonding and pressure, for example, as shown by the crimping sites 30 and 31 identified in the drawings. It will be understood that the two parts of the pedal rod may be joined by any kind of a mechanical joint, whether threaded, or without threads located between the end 17 of the rod or shaft part 10 and the boss on the head part 12.

In accordance with the principles of the present invention, a new and improved spring seat 18 is provided, and for the details of that feature, more specific reference is made to the enlarged details of FIGS. 3 and 4 of the drawings.

First of all the rod or shaft part 10 has a ball 13 formed at one end which has a diametral dimension measured at the widest part of its circumference shown at 50.

The reduced diameter portion 14 of the body portion 16 has a diametral dimension of 51. It is somewhat less than the dimension 50.

Next, we have the tapered portion 15 which forms a ramp between the reduced portion 14 and the body portion 16. In order to practice the principles of the present invention it is contemplated that the diametral dimension of main body portion should be as indicated at 52 and that such diametral dimension should be perhaps five to ten thousandths of an inch (0.005–0.010 inches) larger than the diametral dimension 53, which in turn, is sufficiently larger than the diametral dimension 50 of the ball 13 that it will accommodate axial passage of the cutting and forming tool 100 and which has a forward cutting and forming edge 101 adapted to engage the surface of the main body portion 16.

The cutting and forming tool 100 has a cutting and forming edge 101 which is circumferential in configuration and its inside diameter is essentially the same as the diametral diameter 53, but which is separately identified at 54 (FIG. 3). The dimension 54 is predetermined to be at a selected depth relative to the dimension 52. In this regard, the dimension 54 would be no more than 0.010 inches less than the dimension 52, thereby to cut a very thin laminar peripheral layer of the rod body 16.

The cutting and forming tool 100 is thrust axially and longitudinally by a piston 102. When the cutting and forming edge 101 is advanced in coaxial relationship with the rod or shaft part 10, it initially engages the outer peripheral surface of the main body portion 16 at a location identified at 55, whereupon when it is further advanced relative to the work piece, it starts to displace by laminar flow a thin layer of metal material and advances such mass of metal material as it accumulates axially by laminar displacement through a finite longitudinal dimension indicated at 56.

As a result of such laminar displacement, a mass of the displaced metal piles up and forms a radially outwardly extending circumferentially continuous annular shoulder having a radial wall 18a which has a radially extending diametral dimension 57 which is greater than the dimension 52 of the main body part 16.

The depth of material moved by the cutting and forming edge 101 is identified at 58 and the radial extent of the wall 18a is indicated at 59. It should be understood that the proportions of FIGS. 3 and 4 are not true dimensional proportions but are enlarged for the sake of illustrative exemplification.

By virtue of the techniques described, a relatively thin peripheral layer of material is uniformly removed, or more accurately, displaced, from a very limited longitudinal portion of the periphery of the pedal rod body 16 and forms a highly effective circumferentially continuous annular spring seat 18a, thereby fulfilling all of the structural and functional requirements of the pedal rod in a braking system of an automotive vehicle while minimizing any possible increase in the risks of ultimate failure due to the inadvertent creation of unusual stress patterns in the pedal rod or to untoward and unanticipated operating conditions.

Although various minor modifications might be suggested by those skilled in the art, it should be understood that I wish to embody within the scope of the patent warranted hereon all such modifications as reasonably and properly come within the scope of my contribution to the art.

I claim:

1. A pedal rod for the braking system of an automotive vehicle comprising, an elongated cylindrically shaped body having a ball at its free end adapted to cooperate with the braking mechanism of an automotive vehicle, a reduced diameter shaft portion disposed on an axis extending longitudinally from said ball, a transition stage portion disposed on said axis extending longitudinally from said reduced diameter shaft portion and having radially outwardly extending peripheral walls expanding in a radial taper from said transition stage portion to a first larger diameter body portion, said first larger diameter body portion disposed on said axis and extending longitudinally from said transition stage portion and having a first uniform diametral dimension for a discrete portion of its length, a radially outwardly extending circumferentially continuous annular shoulder having a radial wall which has a radially extending diametral dimension which is greater than the said first diametral dimension of said first larger diameter body portion, thereby to form a circumferentially continuous annular spring seat, said shoulder having a radially inwardly tapered wall extending longitudinally from the outermost periphery of said radial wall and terminating in a second body portion of a second diametral dimension greater than said first diametral dimension of said first body portion but of lesser diametral dimension than the diametral dimension of said radial wall and being disposed on said axis and extending longitudinally from said inwardly tapered wall to form a main body portion, and a head part permanently connected in firm assembly with the end of said second main body portion and by means of which the pedal rod may be operatively connected in the braking system of the automotive vehicle.

* * * * *